(12) United States Patent
Sykes

(10) Patent No.: US 6,524,033 B1
(45) Date of Patent: Feb. 25, 2003

(54) PLUNGE ROUTER DRILLING AND PANEL SIZING GUIDES

(76) Inventor: Edward Sykes, 46, Cawthorns Road, Cygnet 7112, Tasmania (AU)

( * ) Notice: Subject to any disclaimer, the term of this patent is extended or adjusted under 35 U.S.C. 154(b) by 6 days.

(21) Appl. No.: 09/652,772

(22) Filed: Aug. 31, 2000

(51) Int. Cl.⁷ .............................................. B23B 49/02
(52) U.S. Cl. ......................... 408/1 R; 408/3; 408/72 B
(58) Field of Search .......................... 408/1 R, 3, 16, 408/87, 95, 97, 103, 115 R, 234; 269/303, 315, 319; 144/144.51, 144.1, 286.1, 286.5, 287

(56) References Cited

U.S. PATENT DOCUMENTS

| | | | |
|---|---|---|---|
| 2,541,306 A | * | 2/1951 | Taylor ........................ 173/170 |
| 2,780,946 A | * | 2/1957 | McGuire ...................... 249/64 |
| 4,105,359 A | * | 8/1978 | Schneider et al. .......... 408/112 |
| 4,108,566 A | * | 8/1978 | Jones ...................... 408/115 R |
| 4,257,166 A | | 3/1981 | Barker et al. ................. 33/185 |
| 4,668,134 A | * | 5/1987 | Vindez ....................... 408/130 |
| 5,056,966 A | * | 10/1991 | Lee ........................ 408/115 R |
| 5,064,321 A | * | 11/1991 | Barnes ........................ 269/303 |
| 5,114,285 A | | 5/1992 | Brydon ........................ 408/115 |
| 5,318,394 A | | 6/1994 | Pierce et al. .................. 408/72 |
| 5,505,438 A | * | 4/1996 | Baldwin et al. ............ 269/100 |
| 5,560,408 A | | 10/1996 | DiFranco ................. 144/144.1 |
| 5,901,763 A | * | 5/1999 | You ........................ 144/286.1 |
| 6,148,881 A | * | 11/2000 | Valenzuela ................... 108/11 |

* cited by examiner

Primary Examiner—Daniel W. Howell
(74) Attorney, Agent, or Firm—Crompton, Seager & Tufte LLC

(57) ABSTRACT

A system including a bench, selection template and drilling template registerable to the bench. The drilling template including apertures which can receive a guide bushing for guiding a plunge router into a panel for drilling an aperture pattern in the panel. The aperture pattern can be a system 32 pattern.

41 Claims, 7 Drawing Sheets

PLUNGE ROUTER DRILLING AND PANEL SIZING GUIDES

FIELD OF THE INVENTION

This invention relates to the field of machining panels to size, and positioning and drilling apertures in those panels. More particularly, this invention can be used with panel systems such as "system 32 specification" for connectors, hinges, handles, draw or slides and the like.

BACKGROUND OF THE INVENTION

System 32 was devised as a standard aperture spacing approximately 50 years ago to streamline the construction of kitchen cabinets, wardrobes or any cabinets which have their carcasses made from sheet material. Hardware has been manufactured with apertures 32 mm apart or a multiple of 32 mm apart such that it can be readily positioned in its required orientation on a panel drilled in accordance with the system 32 specification.

Often, the vertical panels of the system 32 cabinet are drilled with two continuous, vertical lines of apertures at 32 mm spacing, the front vertical line is set 37 mm from the panel front edge. The back line of apertures is set a multiple of 32 mm from the front line of apertures. Such a configuration provides the first and last apertures for a horizontally mounted piece of hardware such as a drawer runner. These vertical panels are created such that they may be used for left and right hand sides of a cabinet.

The manner in which such panels have been constructed in the past created certain limitations. For example, because the panels are often created as universal panels, they may have many more apertures than are actually needed to mount the hardware. Such universal panels may also omit many apertures which may be needed for specific applications. The role or use of a specific aperture of a universal panel has to be determined each time the panel is employed. In some parts of the world, regulations require that an unused aperture must be coated with a sealant to prevent formaldehyde discharge, making the use of the standard panel a time consuming proposition.

The apertures in these cabinet panels have been drilled by many methods in the past. Tools such as multi-spindle borers were created to produce a line or sometimes two or more lines of apertures using interceded drilling heads. Various hardware manufacturers also offer specialized drill presses which not only bore the apertures necessary to mount their own configuration of, for example, a door hinge, but accept a gear hinge box of five or seven drill bits used for line drilling the panels. A registration pin secured in the last drill aperture positions, the next drilling enabling an operator to work along the panel edge. Numerous drilling gigs have also been created to produce one or two lines of apertures by using sleeves to position the drill bits which are mounted in a portable drill, thus duplicating the original drilling patterns.

SUMMARY OF THE INVENTION

The drilling templates of the present invention differ from those described above in that, for example, the main drilling template presents the operator with an array of system 32 drilling options not only two vertical aperture lines. This allows the operator to drill only the apertures that are necessary for the construction of the cabinet being constructed. The present invention may also allow the operator to code the aperture positions making it more obvious which apertures are used for which purposes. The tool may also be used to produce aperture patterns in mirror pairs for left and right hand sides of a cabinet and by using, for example, a paper template to record that drilling pattern. The drilling pattern may be used to quickly reproduce a panel sometime in the future.

The drilling templates of the present invention are registered to a work table or bench which is created by or supplied with the tool. The panel to be drilled is registered to the bench. Registration blocks can be used to make fine adjustments to the panel position on the bench. In a preferred embodiment, the registration blocks may be used as well to position the drilling template to the bench. Side stops for adjusting the position of the panel on the bench may also be used. Once the panel has been positioned using the registration blocks and side stops, subsequent panels can be quickly registered to these stops. The registration blocks and side stops also help to secure the panel to the bench while work proceeds.

To enable the work to be positioned even more precisely in relation to the drilling templates, measuring sites are supplied with a tool. The measuring sites are preferably formed from circular, transparent material which can be fitted into the template apertures. The sites are scribed with cross hairs like, for example, a gun site, such that a marked position on a panel can be precisely aligned at the intersection of the cross hairs. The mark on the panel can be, for example, the position of the center of the aperture to be drilled. The registration blocks can be equipped with positioning screws to make fine positional adjustments of the panel.

Custom templates can be quickly created with the present invention. A custom template is a piece of sheet material such as plywood, MDF, particle board and the like, which is large enough to accommodate the drilling locations for the panel and registration block position for that panel. The custom template is preferably drilled with a plunge router in conjunction with one or more of the templates, and replaces the drilling templates, and selection and/or paper template. Once a custom template has been created, the plunge router is fitted with the corresponding template guide and bushing, allowing the operator to reproduce the drilling configuration according to the custom template.

If the apertures in the panel are drilled in accordance with the system 32 spacing, the templates can be used without adjustment. If other than system 32 spacings are required, the position of the templates can be adjusted with the aid of the adjustable stops on the registration blocks and side stops and/or a custom template can be used.

The present invention also preferably includes hinge-type templates which preferably can be registered to the registration blocks. A door panel which is drilled by utilizing the hinge templates will be aligned with the hinge mounting plate fastened to the cabinet carcass, when those mounting plates have been positioned in correct relationship to the registration blocks.

DETAILED DESCRIPTION OF THE PREFERRED DRAWINGS

Figure 1:
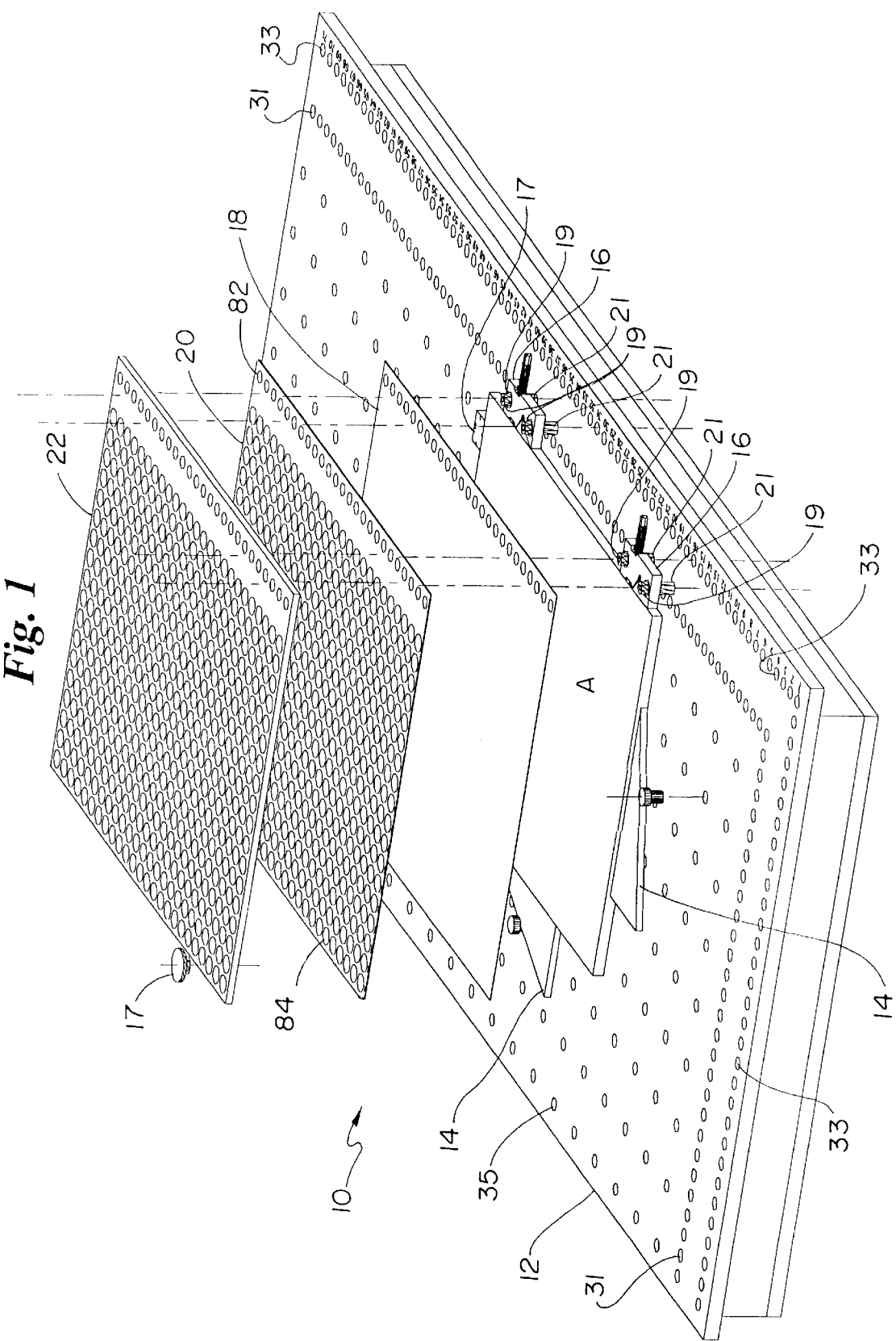
FIG. 1 is an exploded view of the preferred embodiment of a plunge router drilling and panel sizing guide system in accordance with the present invention.

Turning now to the drawings wherein like reference numerals refer to like elements throughout the several views, FIG. 1 is an exploded view of a preferred embodiment of a plunge router drilling and panel sizing guide system 10 in accordance with the present invention. System 10 is shown including a work piece such as a cabinet panel A. System 10 preferably includes a bench 12 and may include wedge clamps 14. A series of templates can be laid over work piece A and registered to bench 12 and work piece A by registration blocks 16. A side registration block 17 may also be used.

In a preferred embodiment, system 10 includes a paper template 18, selection template 20 and main drilling template 22. In an alternate embodiment, selection template 20 can be made from a material such as MYLAR™ and paper template 18 not used. Registration blocks 16 include upper registration pins 19 for insertion into apertures in the templates. Block 16 also include lower registration pins 21 for insertion into apertures in bench 12.

Figure 2:
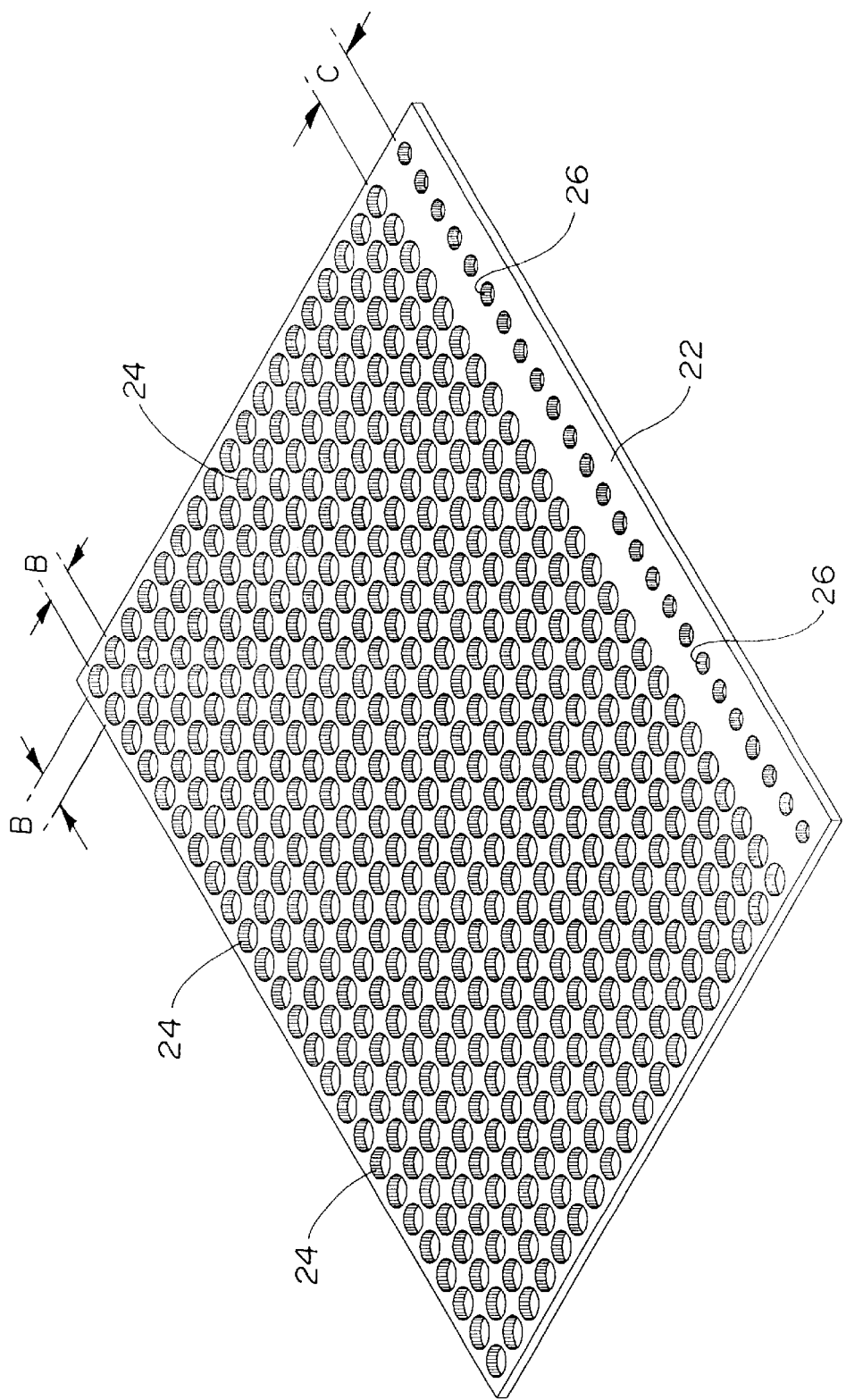
FIG. 2 is a perspective view of a main drilling template.

FIG. 2 shows main drilling template 22. Template 22 is preferably formed from a sheet material and defines a square grid work of apertures 24 disposed preferably 32 mm on center (dimension B). Template 22 is preferably thick and rigid enough to register a plunge router template guide bushing, as known to those skilled in the art, in apertures 24. The row of preferably smaller apertures 26 are sized to accept upper registration pins 19 of registration blocks 16.

Figure 3:
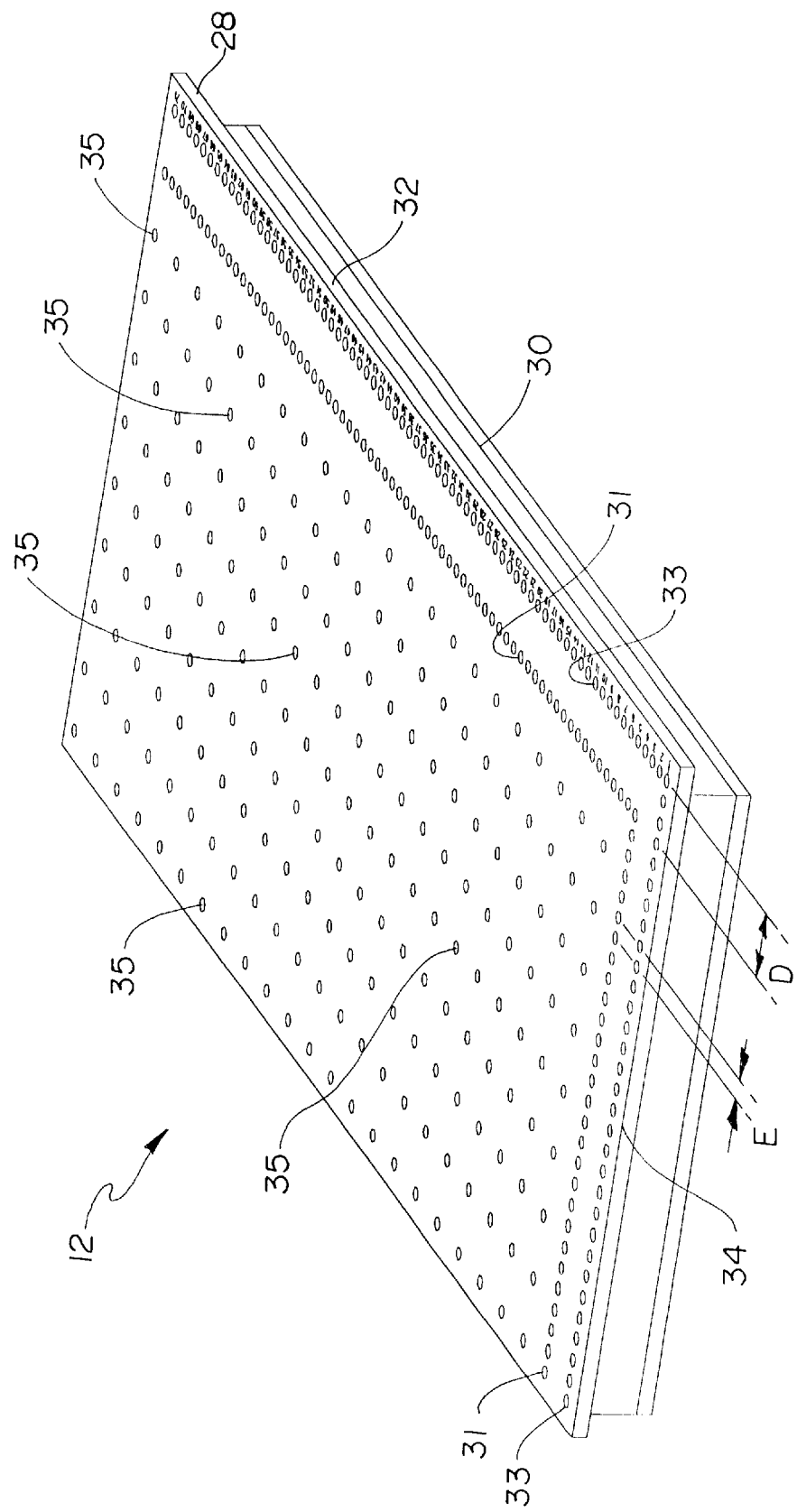
FIG. 3 is a perspective view of a bench.
Figure 4C:
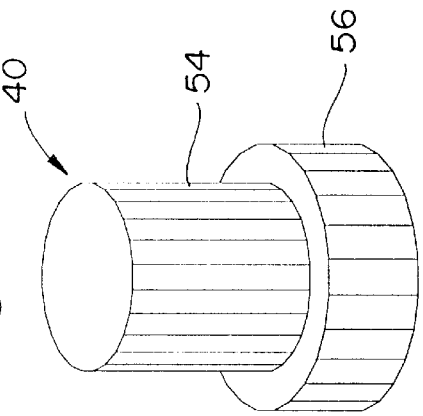
FIG. 4 is perspective views of pins.
Figure 4A:
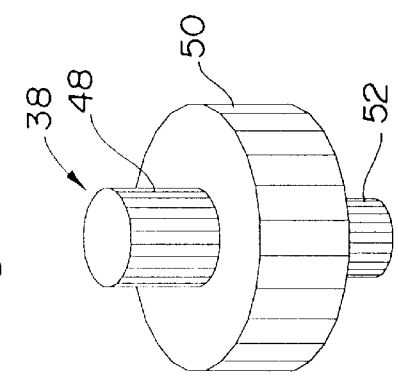
Figure 4B:
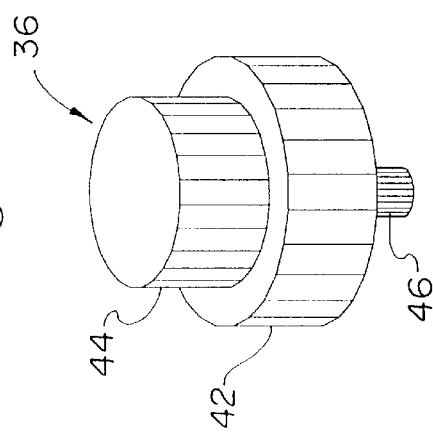
Figure 4E:
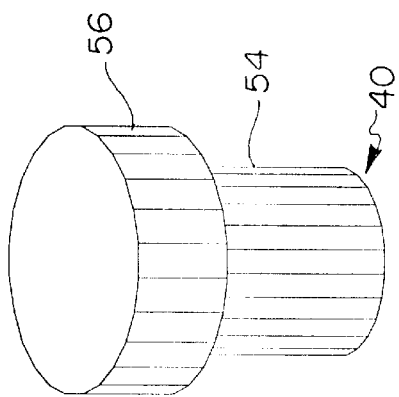
Figure 4F:
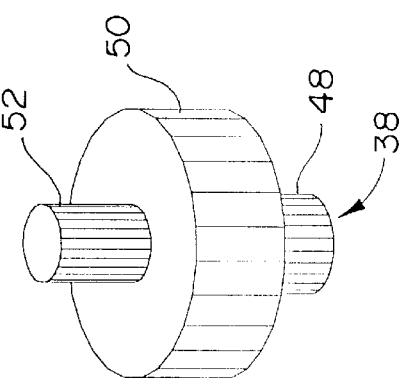
Figure 4D:
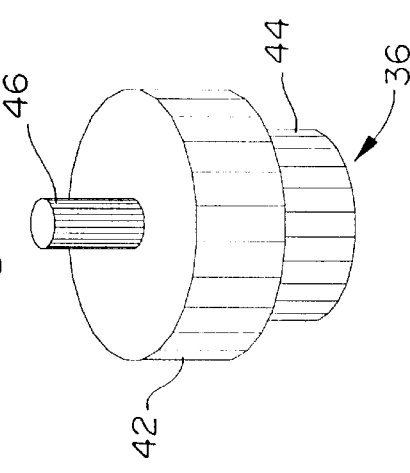

In use, template 22 is registered to bench 12. FIG. 3 shows a perspective view of bench 12 including a top member 28 and support 30. A top member 28 is preferably made of a material thick and rigid enough to support panel A and the various other members of system 10. Top member 28 is preferably, though not necessarily, double skinned. Top member 28 preferably includes two rows of apertures 31 and 33 disposed in parallel with each other and a front edge 32 of top member 28, and a perpendicularly disposed side edge 34 of top member 28. The spacing of the apertures 31 and 33 within each line is preferably 32 mm on center. The apertures 33 along front edge 32 are preferably numbered on member 28 sequentially. The spacing of the lines is preferably 96 mm on center (dimension D). A square grid of apertures 35 is preferably disposed on the remainder of top member 28. This grid is preferably spaced 96 mm on center from apertures 31. Apertures 35 are also preferably spaced from each other at 96 mm on center. Apertures 31, 33 and 35 can be the same diameter though they need not be the same diameter.

FIG. 4 shows a plurality of registration pins 36, 38 and 40. Pin 36 includes a central cylindrical spacer portion 42, a cylindrical pin portion 44 and a smaller diameter pin portion 46. Pin 38 includes a central cylindrical portion 50 a cylindrical pin portion 48 and a smaller diameter pin portion 52. Pin 40 includes a cylindrical pin portion 56 and a smaller diameter pin portion 54. Each pin 36, 38 and 40 shown in FIG. 4 is shown in a first position and in a second position rotated 180°. In a preferred embodiment of the present invention, a pin such as pin 36 can be used to register main drilling template 22 relative to bench top member 28. In a preferred embodiment, apertures 24 and main drilling template 22 are larger than apertures 31, 33 or 35 of bench top member 28. Thus, for example, pin portion 44 of pin 36 may be inserted into a aperture 24 of main drilling template 22 and pin portion 46 into aperture 31, 33 or 35 of bench top member 28. Preferably pin portions 44 and 46 would have less than, but almost the same diameter as the apertures into which they are placed. In such a configuration, spacer 42 will space main drilling template 22 from bench top member 28. Pins 38 and 40 can be used in a similar manner, however, it can be appreciated that pin 40 does not include a spacer.

Bench 12 can be created using drill template 22 or manufactured by processes known to those skilled in the art. If template 22 is used to make bench 12, a plunge router can be fitted with a drilling bit of a size required for drilling the apertures in bench 12, and a router template guide bushing having a diameter corresponding to the diameter of apertures 24. The template guide bushing is secured to the base plate of the router in such a way that the cylindrical sleeve of the bushing will project perpendicularly from the router base and be disposed concentrically about the axis of rotation of the router bit. This will allow the bit to pass centrally through the sleeve and thus have a common center with apertures 24 of template 22. When using a plunge router with system 10, the bit is preferably center in the guide bushing as described above in this paragraph.

Prior to drilling, template 22 can be clamped to top member 28 along side 32 such that a row of apertures 24 is adjacent and parallel that side. The row of apertures 24 can be used to guide the plunge router to form apertures 33 of bench top member 28. As apertures 33 are parallel apertures 33 and the parallel lines of apertures 31 and 33 lie 96 cm apart, the fourth row of apertures 26 can be used to form apertures 31. The remainder of the apertures 31 and 33 parallel to a side 34 of bench top member 28 can be formed in a similar manner. Once apertures 33 are formed, pins such as pins 36 can be used to hold main drilling template 22 squarely to bench top member 28 to form apertures 35. If, as shown in FIG. 1, bench top member 28 has a larger surface area than main drilling template 22, main drilling template 22 can be moved across member 28 to drill additional apertures 31, 33 and 35 as necessary, and held in place by pins such as pins 36, 38 or 40.

Figure 5:
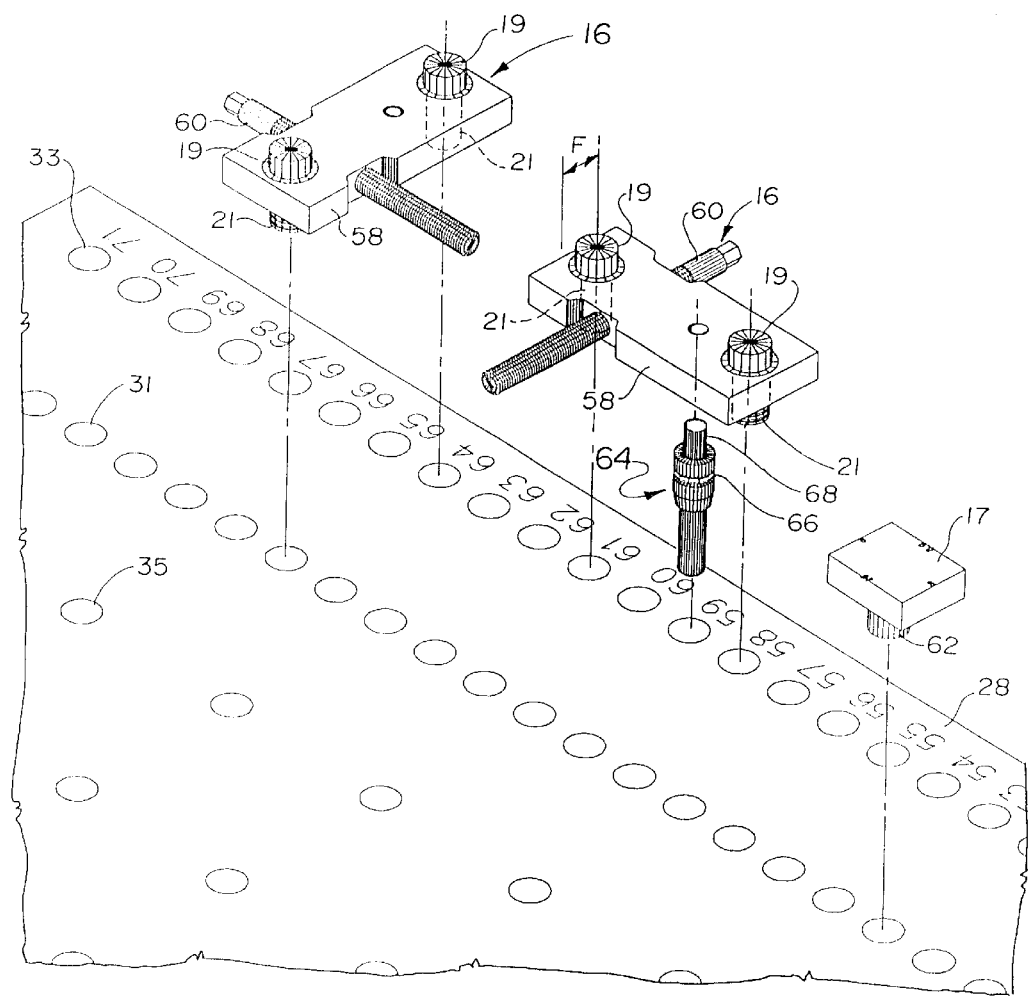
FIG. 5 is an exploded, perspective view of registration blocks and a side block.

FIG. 5 is an exploded view of registration blocks 16 and side registration block 17 aligned with apertures 31 and 33 or bench top member 28. As shown in FIG. 5, lower registration pins 21 of registration block 16 can be placed in apertures 33 such that registration block 16 is disposed parallel to the row of apertures 33 and the row of apertures 31. Alternately, registration block 16 can be placed perpendicularly to these rows by inserting one lower registration pin 21 in a aperture 33 and one lower registration pin in a aperture 31.

As can be seen, upper registration pins 19 and lower pins 21 are concentrically disposed around the same vertical axis. The distance F from this vertical axis to a front surface 58 of registration block 16 is preferably 27 mm. Front surface 58 is preferably parallel to a line between the two axes running vertically through each upper and lower registration pins 19 and 21, respectively such that front surface 58 will be parallel to the line of apertures 33 when both lower registration pins are placed in apertures 33. Similarly, front surface 58 will be perpendicular to the line of apertures 33 when one lower registration pin 21 is placed in a aperture 33 and another in the aperture 31 as shown.

The diameter of upper registration pins 19 is preferably approximately equal to, but less than the diameter of the apertures into which they will be inserted. Additionally, upper registration pins 19 preferably are threaded into registration block 16 so that they can be extended vertically from registration block 16 to accommodate varying panel thicknesses. Pin 19 can include a collar (not shown) to support template 22. Lower registration pins 20 and pin 62 also preferably are approximately the same size, and approximately equal in size to the apertures into which they will be placed such that they will fit snuggly but releasably into the apertures in which they are placed.

Block 16 can also include a locking mechanism 64 to secure block 16 to bench top member 28. This can include a circular pin 66 which can be threadably attached to block 16. Pin 64 can include a collet or the like which is known to those of skilled in the art, which is alternately expandable or contractible. Collet 68 can be inserted in a contracted position into a aperture and then expanded to retain registration blocks 16 to bench top member 28.

Registration blocks 16 preferably include fine adjustment screws 60. Fine adjustment screws 60 are shown extending beyond front surface 58 of registration block 16. Screws 60 could be retracted such that a work piece could be aligned against front surface 58. Alternatively, adjustment screws 60 could be extended beyond front surface 58 as shown to align the work piece or panel away from front surface 58.

Side registration block 17 is preferably rectangular and includes a lower registration pin 62. Preferably, each vertical side of side registration block 17 is disposed at a different distance from the central axis of lower registration pin 62.

Figure 6:
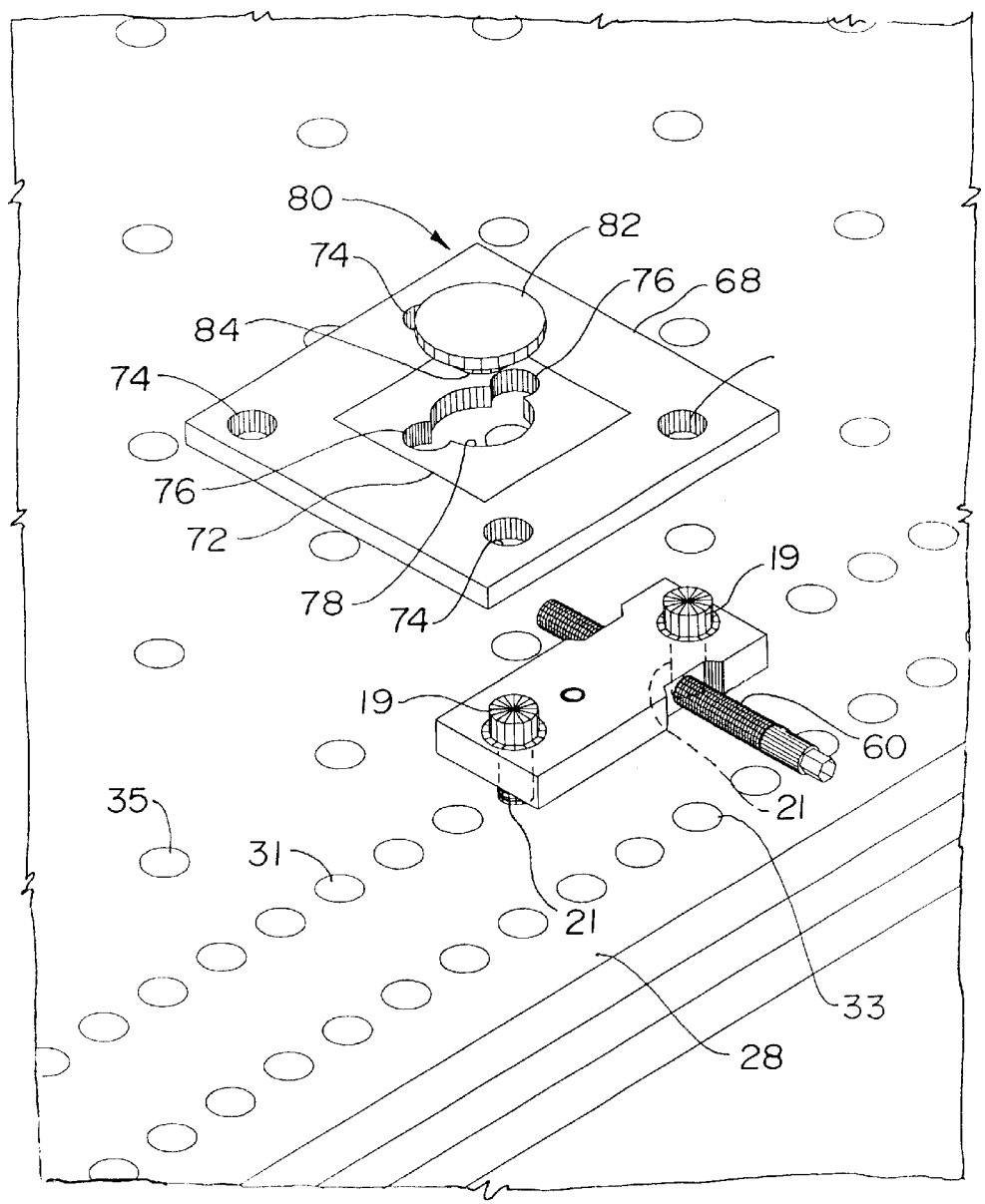
FIG. 6 is an exploded view of a hinge template, registration block and a portion of the bench.

FIG. 6 shows bench top member 28 and a registration block 16 as described above. FIG. 6 also shows a hinge template 68. Hinge template 68 is preferably formed from material similar to main drilling template 22. Template 68 preferably includes an outer frame 70 and a template insert 72 which can be releasably securely placed in frame 70. Frame 70 preferably includes a plurality of apertures 74 configured to receive upper registration pins 19 of registration block 16. Various inserts 72 can be placed in frame 70 for different hinges or hinge standards.

If system 32 hinges are utilized, most manufacturers have accepted a 35 mm diameter central bore as standard, but have differentiated their hinge hardware by choosing different spacings for the selection lugs of their hinges. Each insert 72 preferably includes one large template aperture 78 and two smaller template apertures 76, each of which is disposed relative to each other such that three apertures may be bored in a panel to accommodate hinge hardware. The relative positioning of apertures 76 and 78 will depend on the specific hinge to be placed. It can be appreciated that if hinge hardware required more than three apertures to be drilled additional apertures could be provided. It is anticipated that hinge template 68 can be adjusted to accommodate, among other styles of hinges, a wing plate and an inline plate.

Also shown in FIG. 6 is a measuring site 80. Measuring site 80 is preferably transparent and includes centrally located cross hairs 82. Site 80 preferably includes a lower cylindrical portion 84 which is sized to fit in guide 78. In use, registration block 16 is positioned on bench top member 28, the center of the main bore aperture for the hinge is marked as panel A. The proper insert 72 is selected for the type of hinge being used. The panel is aligned against registration block 16 until cross hairs of site 80 are positioned directly over the mark for the center of the main bore aperture on panel A. The site is then removed and a plunge router previously equipped with a bushing sized to have a close tolerance fit with aperture 78, an appropriate bit and set for the appropriate bore depth is placed into aperture 78 and the bore is made by the router as known by those skilled in the art. It can be appreciated that a different sized bushing would be necessary when boring apertures into the panel corresponding to the locations of guide 76. Sites can also be used in apertures 24 of template 22.

The distance of the hinge drilling pattern to the edge of the panel is variable. Thus, the relative position of apertures 76 and 78 from registration block 16 must vary accordingly. This variation can be accommodated by providing hinge inserts 72 corresponding to a given drilling pattern. The hinge drilling pattern is a function of hinge geometry, the depth of the mounting plate, and the thickness of the carcass material. It is usually determined by a chart issued by a hinge manufacturer and is known as the door-to-bore edge distance or DBE.

In use, system 10 is preferably used to create system 32 panels. System 10 could be used to create non-system 32 parts, however, system 10 is particular useful to make system 32 panels.

As shown in FIG. 1, registration blocks can be placed into apertures 33 such that front surface 58 is parallel to the line of apertures 33. A side of panel A can be placed flush against front surfaces 58. If panel A is placed against surface 58, then the first adjacent row of apertures 24 will be 37 mm from the edge of the panel resting against front surfaces 58 of registration blocks 16 when dimension C is 64 mm and dimension F is 27 mm. The 37 mm spacing can be decreased by advancement of screws 60 beyond front face 58.

Side registration block 17 or another registration block 16 can be used to position panel A in the dimension parallel front surface 58 of registration block 16. Thus, panel A can be precisely positioned on the two dimensional plane defined by top member 28 of bench 12. Wedge clamps 14 including pins insertable into apertures 35 can be placed against sides of the panel opposite registration blocks 16 and side registration block 17. Alternately, additional side registration blocks could be used rather than wedge clamps 14 to secure the position of panel A on top member 28.

To assist in the selection of apertures to be drilled into panel A, selection template 20 is placed over panel 16 and registered to upper registration pins 19 of registration block 16. Selection template 20 is preferably formed from a transparent plastic, MYLAR™ or the like. Selection template 20 preferably includes a row of apertures 82 corresponding in diameter and positioned to apertures 26 of main drilling template 22. Selection template 20 also preferably includes an array of circles 84 printed on the template which correspond in diameter and relative location to apertures 24 of main drilling template 20.

Apertures 82 can be used to register selection template 22 to panel A by inserting upper registration pins 19 through apertures 82 of selection template 20. If panel A is larger than selection template 20, than more than one selection template 20 can be joined, for example, with adhesive tape to create a template of the required size. Once selection template 20 is in position on panel A, the apertures to be drilled into panel A can be selected and marked on the template by or in the corresponding circle with a marker. The panel aperture diameter and depth can be color coded or otherwise marked. Apertures 82 through which registration pins 19 extend are also marked. Drilling template 22 is then overlayed and registered on registration pins 19 of registration blocks 16 such that apertures 24 are aligned with circles 84 and apertures 26 are aligned with apertures 82. A plunge router equipped with a template guide bushing selected for close tolerance fit in apertures 24 and appropriate drill bit and plunge depth setting is then employed to create the desired apertures in panel A at the marked locations.

To produce mirror image drilling patterns, side stop 17 is placed to the opposite side of panel A in the same relative position to registration blocks 16 as previously positioned relative to registration block 16 for the first panel. Selection template 20 is then reversed and registered to registration pins 19 where previously marked and the process is repeated as before. If it is desired to use selection template 20 for various panel aperture arrangements, the marks made on selection template 20 can be made with temporary marker. The marks can then be recorded on paper template 18 for later use. Alternately, the marks could be permanently retained on selection template 20 and additional selection templates acquired for different panels. In such a case, it would be desirable to use a relatively inexpensive material such as MYLAR™ to form selective template 20.

The entire aperture pattern for a panel can be repeated in the future by recording the location of apertures to be drilled in panel A and the location of upper registration pins 19 relative to the template and the location of side registration block 17 on template 20 or paper template 18.

It can be appreciated that custom drilling templates can be created and used instead of main drilling template 22 and selection template 20. A custom template can be configured to provide apertures for drilling panel apertures at predetermined locations for any size panel A and registered to bench 12 as is main drilling template 22.

Figure 7:
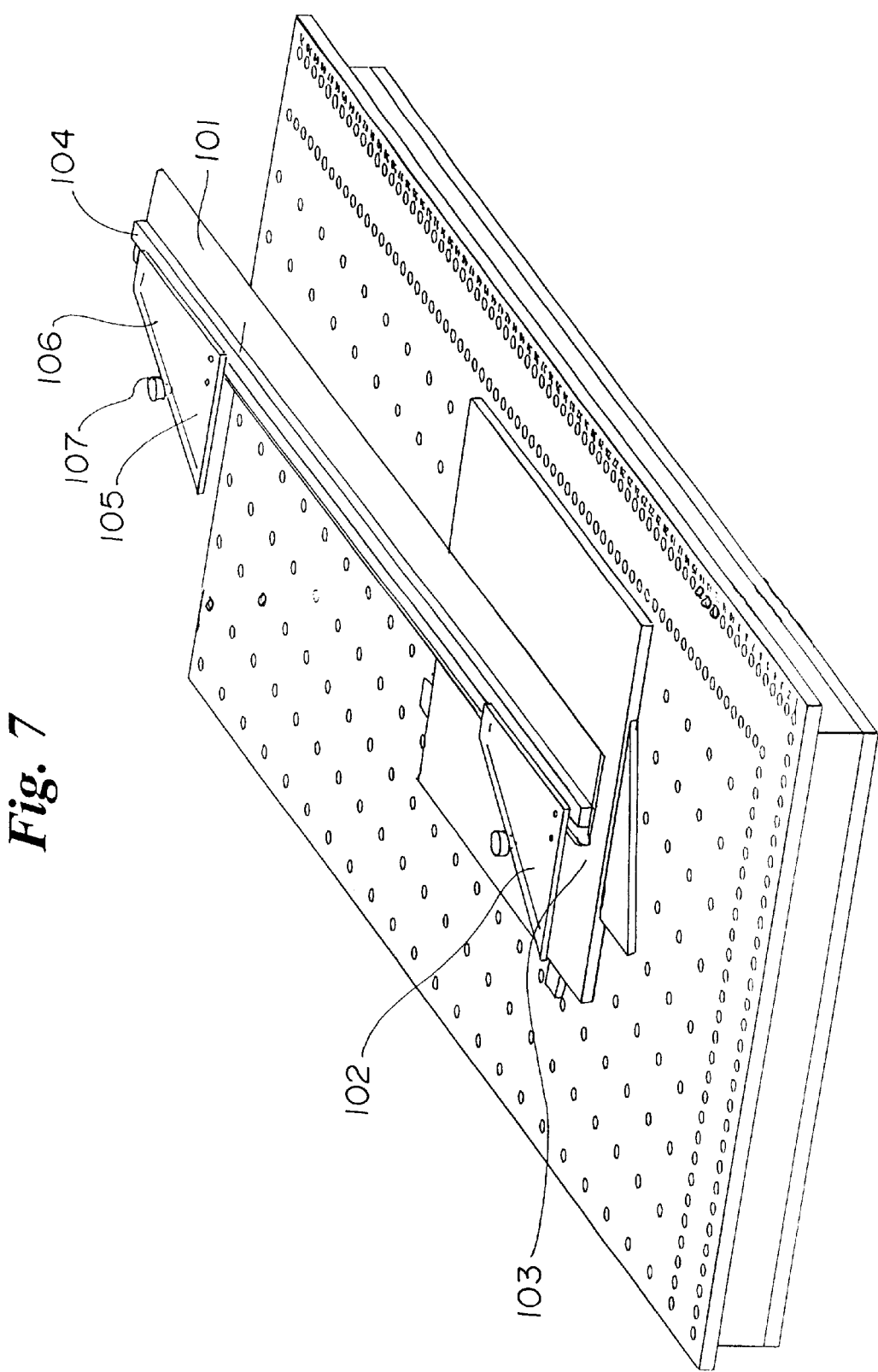
FIG. 7 is an exploded view of a fence and the bench.

For accurately sizing panels the panel fence of FIG. 7 is employed. The fence 101 and the panel advancing mounts 102 are secured to the bench via the locking bars 103.

The panel fence is a means of controlling a router which sits on the replaceable base of the fence, and bears against the vertical wall of the fence 104, the width of the base is defined and created by mounting the router bit selected for the task in the router and using it to trim the base while the router is being slid along the fence face 104. This will produce an edge which defines the path of the bit, and to which calibrated panels can be aligned.

In order to set the fence for use, two apertures should be selected in the bench through which the locking bars 103 will pass. It must be sufficiently far apart to allow the panel to registered between them unimpeded. The bars are then inserted and fastened into the registration apertures in the panel in the parallel advancing mounts 105, and the selected bench apertures. The parallel advancing mounts are then attached via the key slot to the fence 104, thereby defining the correct distance apart from the mounting plates.

The mounting plates are then removed from the locking bars, the bars passed through the angle slots of the plates 106 and secured by the threaded locking nuts 107. Moving the fence in a direction parallel to the two locking bars will now alter its position perpendicular to those bars. When used in conjunction with stops inserted into the bench, a panel can be locked in to position and the fence adjusted to a calibrated position scribed on the panel. The resultant machining path will be parallel to the locking bars securing the fence, and the back stops which define the panel position if they are set parallel to the locking bars. The fence can be reset at right angles to its original setting, or the panel routed through 90° allowing the joiner to create perfectly rectangular panels.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A method of creating panels, comprising the steps of:
providing a bench having a top surface, a front edge, a side edge perpendicular to the front edge, two rows of registration apertures disposed in parallel with one another and generally following the front edge and the side edge, and a square grid of apertures disposed over at least a portion of the top surface;
disposing a work piece on the bench;
providing a registration block having a lower registration pin and an upper registration pin;
disposing the lower registration pin into the registration aperture of the bench to align the work piece to the bench;
disposing a selection template having a plurality of apertures proximate the work piece, wherein the selection template is registered to the bench by disposing the upper registration pin within one of the apertures of the selection template;
marking a desired location for a newly formed aperture within the work piece;
disposing a main drilling template having a plurality of apertures proximate the selection template, wherein the main drilling template is registered to the bench by disposing the upper registration pin within the aperture of the main drilling template;
providing a plunge router equipped with a template grid bushing;
creating the newly formed aperture within the work piece at the desired locations with the plunge router.

2. A plunge router drilling and panel sizing guide system, comprising:
a bench having a top surface and a plurality of apertures;
a work piece, wherein the work piece is adapted to be disposed proximate the top surface of the bench;
a selection template registerable to the bench, the selection template having a plurality of apertures; and
a main drilling template registerable to the bench, the main drilling template having a plurality of apertures;
wherein one of the plurality of apertures of the selection template has a diameter and one of the apertures of he main drilling template has a diameter.

3. The plunge router drilling and panel sizing guide system in accordance with claim 2, wherein the selection template is comprised of MYLAR™.

4. The plunge router drilling and panel sizing guide system in accordance with claim 2, further comprising a registration block including a lower registration pin adapted to be inserted into the apertures within the bench.

5. The plunge router drilling and panel sizing guide system in accordance with claim 2, further comprising a registration block including an upper registration pin.

6. The plunge router drilling and panel sizing guide system in accordance with claim 5, wherein the upper registration pin has a diameter less than the diameter of the aperture of the selection template.

7. The plunge router drilling and panel sizing guide system in accordance with claim 5, wherein the upper registration pin has a diameter less than the diameter of the aperture of the main drilling template.

8. The plunge router drilling and panel sizing guide system in accordance with claim 5, further comprising a hinge template including an outer frame and a template insert, wherein the hinge template is registerable to the bench and includes at least one aperture adapted to receive the upper registration pin.

9. The plunge router drilling and panel sizing guide system in accordance with claim 8, further comprising a measuring site adapted to be disposed within an aperture within the template insert.

10. The plunge router drilling and panel sizing guide system in accordance with claim 5, further comprising a paper template registerable to the bench, the paper template including a plurality of apertures; wherein one of the apertures of the paper template has a diameter.

11. The plunge router drilling and panel sizing guide system in accordance with claim 10, wherein the paper template is disposed between the selection template and the main drilling template.

12. The plunge router drilling and panel sizing guide system in accordance with claim 10, wherein the upper registration pin has a diameter less than the diameter of the aperture of the paper template.

13. The plunge router drilling and panel sizing guide system in accordance with claim 2, further comprising a wedge clamp registerable to the bench.

14. The plunge router drilling and panel sizing guide system in accordance with claim 2, further comprising a side registration block registerable to the bench.

15. The plunge router drilling and panel sizing guide system in accordance with claim 2, further comprising a locking mechanism and a registration block, wherein the locking mechanism secures the registration block to the bench.

16. The plunge router drilling and panel sizing guide system in accordance with claim 2, further comprising a fine adjustment screw having a front surface and a registration block, wherein the registration block includes a front surface having a first direction extending outwardly from and normal to the front surface and a second direction extending in the opposite direction from the first direction, and wherein the fine adjustment screw is at least partially disposed in the registration block and has a longitudinal axis which intersects the front surface of the registration block.

17. The plunge router drilling and panel sizing guide system in accordance with claim 16, wherein the front surface of the screw can be retracted to be coplanar with or in the second direction from the front surface of the registration block to align the work piece against the front surface of the registration block.

18. The plunge router drilling and panel sizing guide system in accordance with claim 16, wherein the front surface of the screw can be in the first direction from the front surface of the registration block to align the work piece away from the front surface of the registration block.

19. The plunge router drilling and panel sizing guide system in accordance with claim 2, further comprising a panel fence having a locking bar registerable with the bench.

20. A plunge router drilling and panel sizing guide system, comprising:
    a bench having a top surface, a front edge, a side edge perpendicular to the front edge, two rows of registration apertures disposed in parallel with one another and generally following the front edge and the side edge, and a square grid of apertures disposed over at least a portion of the top surface;
    a work piece, wherein the work piece is adapted to be disposed proximate the top surface of the bench;
    a registration block including a lower registration pin adapted for inserting into the registration apertures in the bench and an upper registration pin;
    a paper template registerable to the bench, the paper template having a plurality of apertures adapted to receive the upper registration pin;
    a selection template registerable to the bench, the selection template having a plurality of apertures adapted to receive the upper registration pin; and
    a main drilling template registerable to the bench, the main drilling template having a square grid of apertures and a row or registration apertures adapted to receive the upper registration pin.

21. The plunge router drilling and panel sizing guide system in accordance with claim 20, wherein the spacing of apertures within each row of registration apertures within the bench is about 32 millimeter on center.

22. The plunge router drilling and panel sizing guide system in accordance with claim 20, wherein the spacing between rows of registration apertures within the bench is about 96 millimeters on center.

23. The plunge router drilling and panel sizing guide system in accordance with claim 20, wherein the spacing between apertures of the square grid of apertures within the bench is about 96 millimeter on center.

24. The plunge router drilling and panel sizing guide system in accordance with claim 20, wherein the spacing between the square grid of apertures within the bench and the rows of registration apertures within the bench is about 96 millimeters on center.

25. The plunge router drilling and panel sizing guide system in accordance with claim 20, wherein the spacing between apertures of the square grid of apertures within the main drilling template is about 96 millimeter on center.

26. The plunge router drilling and panel sizing guide system in accordance with claim 20, further comprising a wedge clamp coupled to the bench.

27. The plunge router drilling and panel sizing guide system in accordance with claim 20, further comprising a side registration block registerable to the bench.

28. The plunge router drilling and panel sizing guide system in accordance with claim 20, further comprising a locking mechanism to secure the registration block to the bench.

29. The plunge router drilling and panel sizing guide system in accordance with claim 20, further comprising a fine adjustment screw having a front surface; and wherein the registration block includes a front surface having a first direction extending outwardly from and normal to the front surface of the registration block and having a second direction in an opposite direction from the first direction, and wherein the fine adjustment screw is at least partially disposed in the registration block and has a longitudinal axis which intersects the front surface of the registration block.

30. The plunge router drilling and panel sizing guide system in accordance with claim 29, wherein the front surface of the screw can be retracted to be coplanar with or in the second direction from the front surface of the registration block to align the work piece against the front surface of the registration block.

31. The plunge router drilling and panel sizing guide system in accordance with claim 29, wherein the front surface of the screw can be extended in the second direction from the front surface of the registration block to align the work piece away from the front surface of the registration block.

32. The plunge router drilling and panel sizing guide system in accordance with claim 20, further comprising a hinge template including an outer frame and a template insert, wherein the hinge template is registerable to the bench and includes at least one aperture adapted to receive the upper registration pin.

33. The plunge router drilling and panel sizing guide system in accordance with claim 32, further comprising a measuring site adapted to be disposed within an aperture within the template insert.

34. The plunge router drilling and panel sizing guide system in accordance with claim 20, further comprising a panel fence having a locking bar registerable with the bench.

35. The method in accordance with claim 1, further comprising the step of disposing a paper template having a plurality of apertures proximate the bench, wherein the paper template is registered to the bench by disposing the upper registration pin within one of the apertures of the paper template.

36. The method in accordance with claim 1, wherein the step of marking a desired location for an aperture within the work piece includes creating a marking on the selection template.

37. The method in accordance with claim 1, wherein the step of marking a desired location for an aperture within the work piece includes creating a marking on the work piece.

38. The method in accordance with claim 1, further comprising the step of providing a second registration block having a lower registration pin and an upper registration pin and disposing the lower registration pin in the registration aperture of the bench.

39. The method in accordance with claim 1, further comprising the step of coupling a wedge clamp to the bench to secure the work piece to the bench.

40. The method in accordance with claim 1, further comprising the step of coupling a side registration block to the bench to secure the work piece to the bench.

41. The method in accordance with claim 1, further comprising the step of coupling a hinge template to the bench.

* * * * *